Feb. 3, 1959 W. J. SACKETT 2,871,510
GRANULATOR
Filed March 6, 1956 8 Sheets-Sheet 1

INVENTOR
Walter J. Sackett.

BY
ATTORNEY

Feb. 3, 1959 W. J. SACKETT 2,871,510
GRANULATOR
Filed March 6, 1956 8 Sheets-Sheet 2
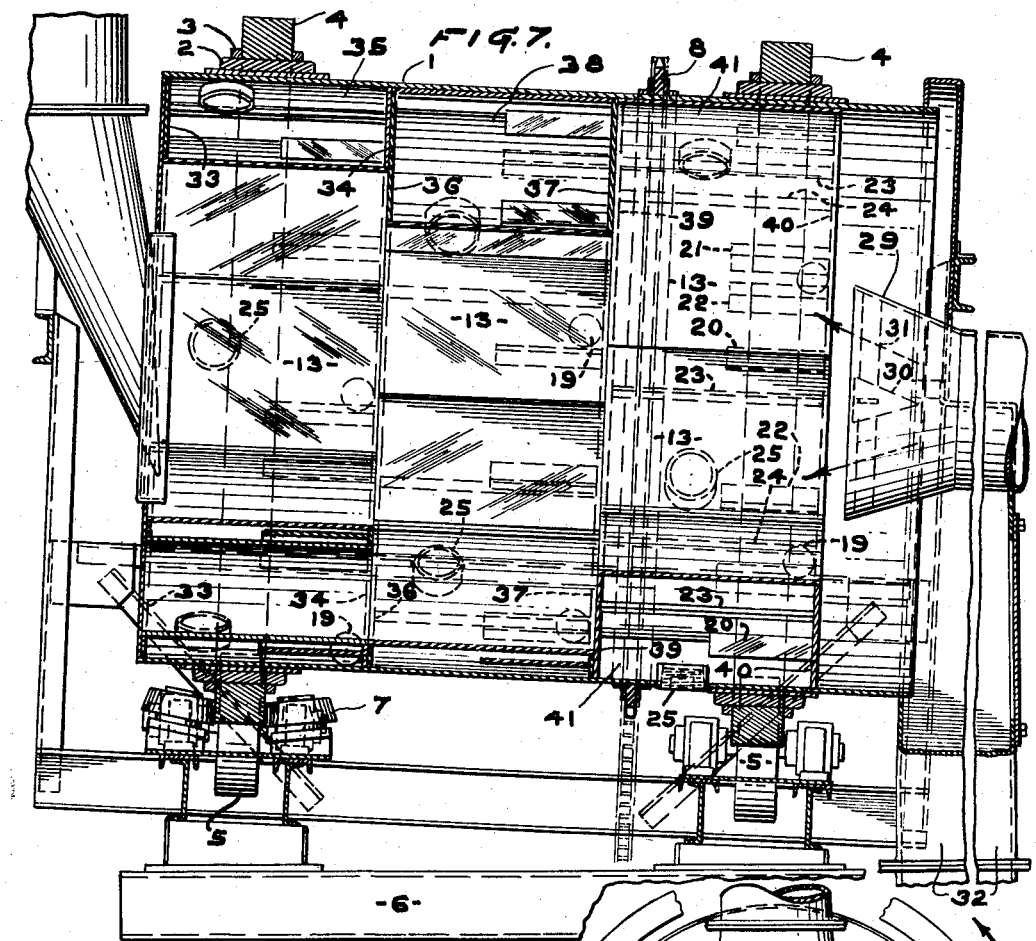
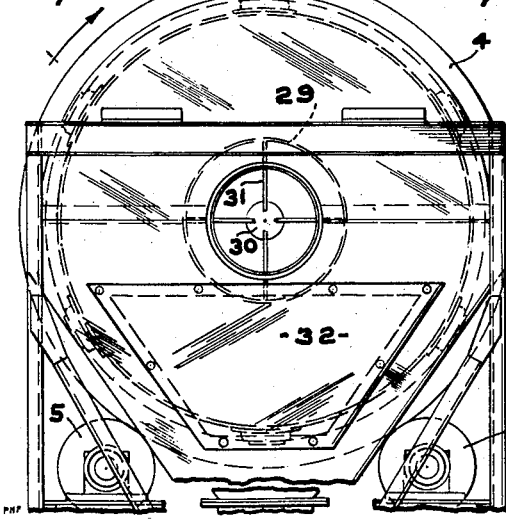
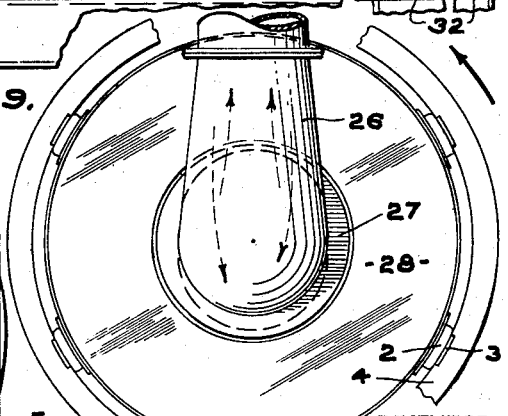
INVENTOR
Walter J. Sackett
BY
ATTORNEY Feb. 3, 1959 W. J. SACKETT 2,871,510
GRANULATOR
Filed March 6, 1956 8 Sheets-Sheet 3
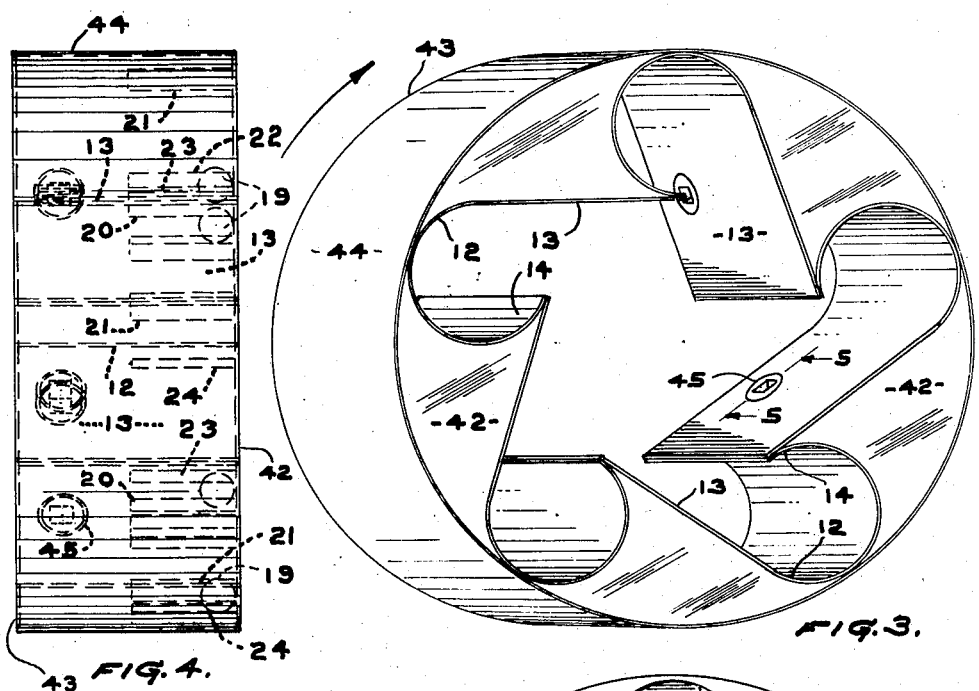
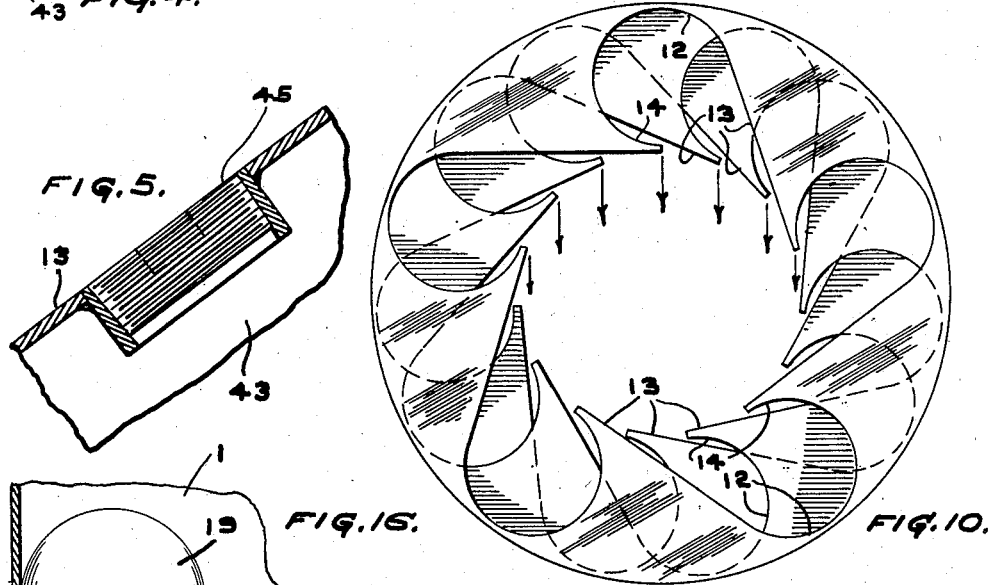
INVENTOR
*Walter J. Sackett*
BY
ATTORNEY Feb. 3, 1959 W. J. SACKETT 2,871,510
GRANULATOR
Filed March 6, 1956 8 Sheets-Sheet 4
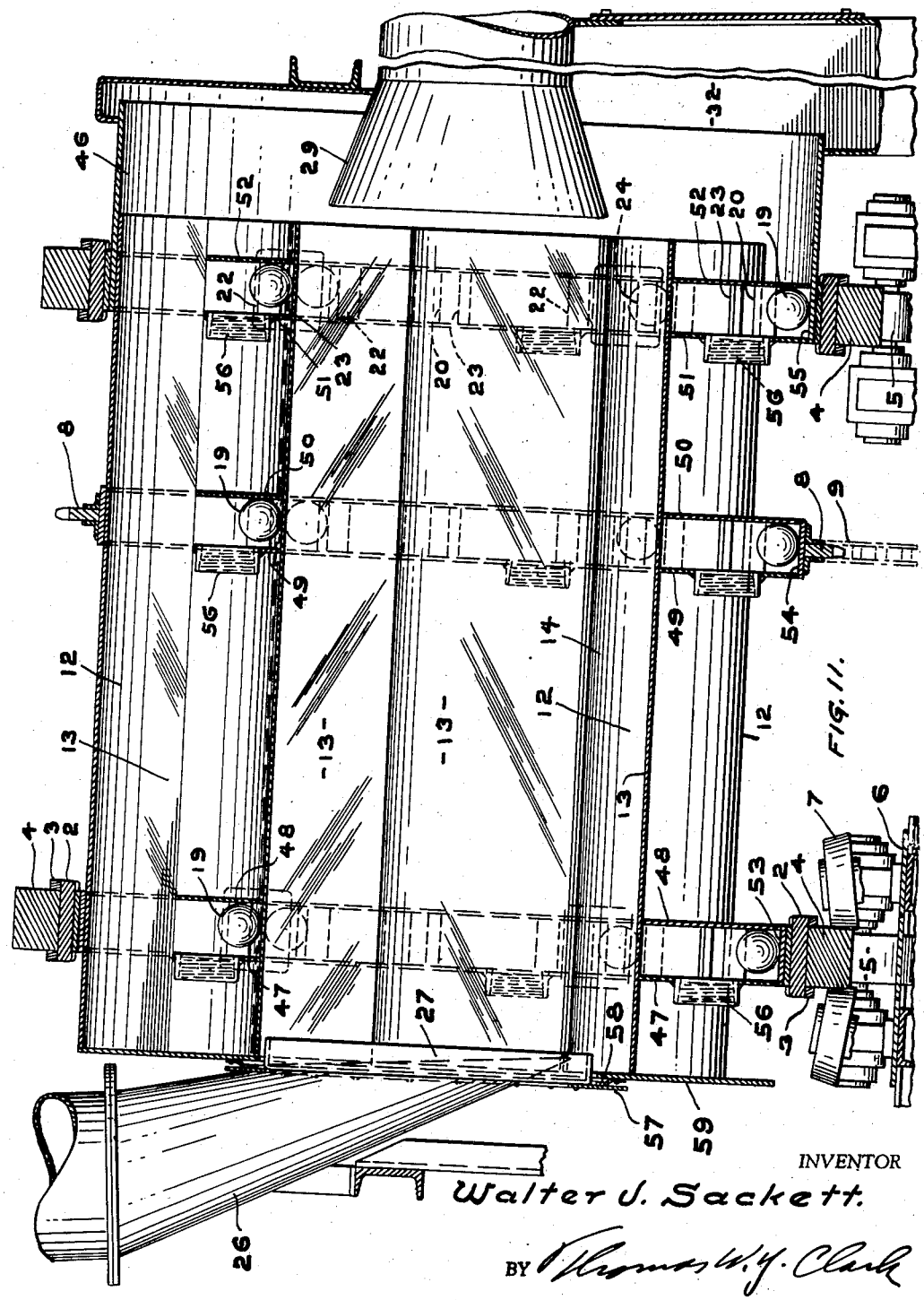
INVENTOR
Walter J. Sackett.
BY
ATTORNEY Feb. 3, 1959 W. J. SACKETT 2,871,510
GRANULATOR
Filed March 6, 1956 8 Sheets-Sheet 5

INVENTOR.
Walter J. Sackett.
BY Thomas W. J. Clark
ATTORNEY

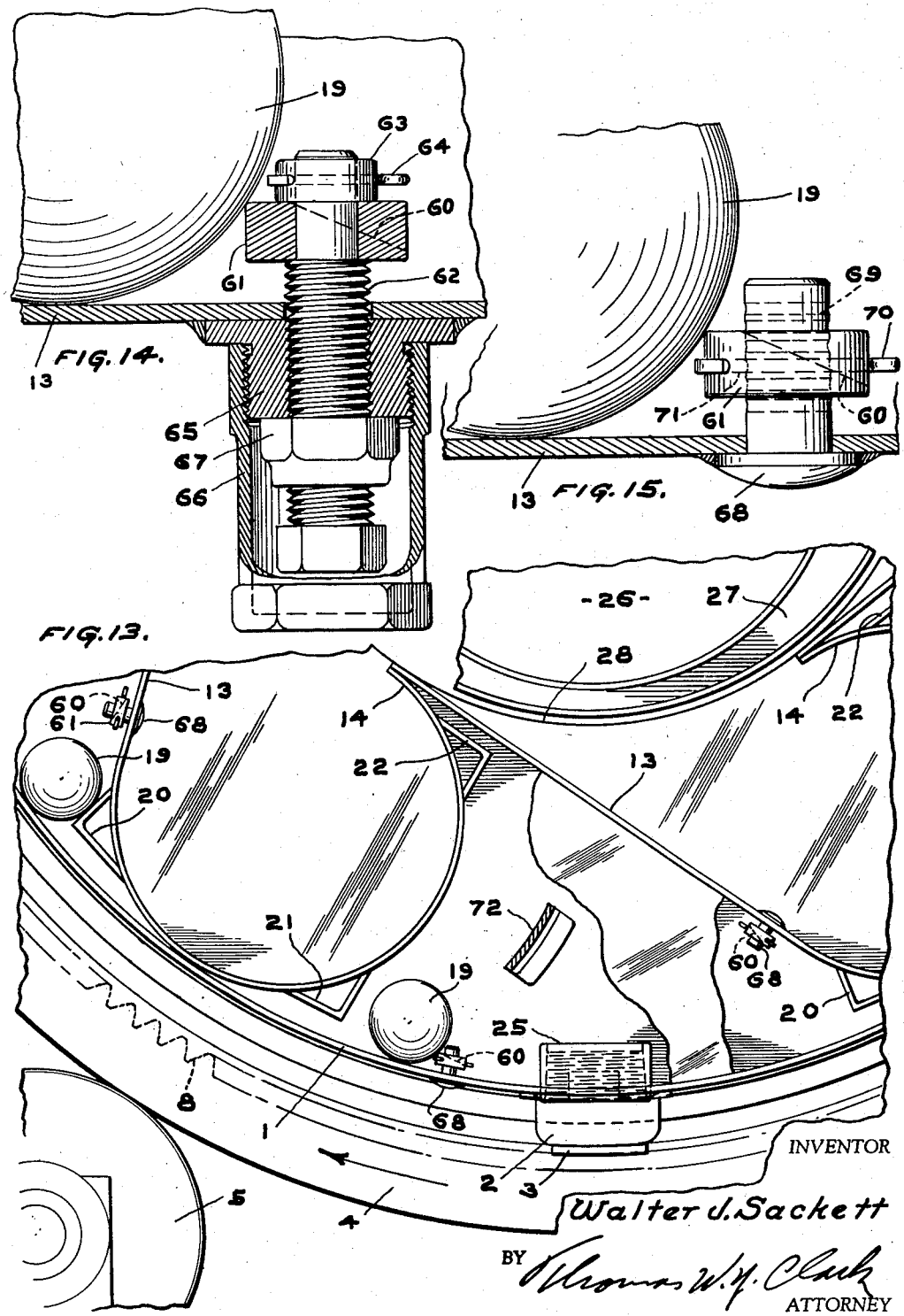

Feb. 3, 1959 — W. J. SACKETT — 2,871,510
GRANULATOR
Filed March 6, 1956 — 8 Sheets-Sheet 7

INVENTOR
Walter J. Sackett
BY
ATTORNEY

United States Patent Office 2,871,510
Patented Feb. 3, 1959

2,871,510

GRANULATOR

Walter J. Sackett, Baltimore, Md., assignor to The A. J. Sackett & Sons Company, Baltimore, Md., a corporation of Maryland Application March 6, 1956, Serial No. 569,892

12 Claims. (Cl. 18—1)

This invention relates to an apparatus which may be called a granulator, for granulating or forming pellets, by an intensive rolling action of moist fertilizer compounds or other materials having similar physical characteristics, and has means for surface hardening the materials formed into pellets by passing them through a forced draft of air.

Heretofore, in efforts to granulate such materials, the particles have so widely varied in size, and so much of the initial material input has failed to form into pellets as to cause a large portion, sometimes over one-half of said initial input, to pass a twenty-four mesh screen. This fine portion is not acceptable as a granular product and must be re-run through further moisture treatment and re-granulated into particles of sufficient size for commercial acceptance, the particle size which is generally acceptable as a granular product is one passing through a six mesh screen and which is retained on a twenty-four mesh screen.

By granulating a substantially greater portion of the initial material input to a product in the above range of particle sizes, and substantially reducing the portion requiring re-processing, this apparatus is capable of producing a substantially higher output of commercially acceptable granular product in a given period of time.

In the apparatus of the present invention a plurality of pockets are placed symmetrically about the interior of the drum, the pockets having walls extending to an axial circular surface hardening area or zone, one wall of each pocket being substantially plane and extending substantially tangential to the surface hardening area or zone to form a rolling surface for particles of the material that may be dropped thereto from upper pockets as they discharge the material through the surface hardening area or zone to the lower rolling surfaces of the lower pockets as the drum rotates carrying the several pockets or compartments around.

The object of the invention is the production of an apparatus which will produce the maximum quantity of fertilizer or other compounds in a commercially acceptable granular form and to surface harden the granular material by passing it through a forced air stream. This is accomplished by giving the particles a maximum rolling action in a drum containing pockets or compartments and producing a curtain or cascade of the material falling through an air stream which surface hardens the pellets formed by the rolling surfaces of the compartments in the drum. By the use of the pockets, the rolling surface area of the drum is greatly increased, and with the multiplicity of small compartments which substantially lift the continuously rolling material with the rotation of the drum, it is dropped in a continuous cascade through the surface hardening area to the rolling surfaces below. The dropping and rolling are not primarily to mix the constituents of the material, that mixture having been effected before the feeding of the material to the drum. The dropping and rolling are rather to increase the size of the particles to a measure of uniformity and especially to avoid the formation of fines, or the fine material which would have to be re-circulated. The multiplicity of the pockets also tends to break up larger masses of the material, so that uniformity is promoted both from large to small and from small to larger.

With the multiplicity of small pockets there is a tendency of the material to adhere to the sides of the pockets and to overcome this tendency, balls are placed in casings back of the pockets of adequate weight so that the outsides of the pockets will be struck by the balls with the rotation of the drum and break loose any material in the pockets. Stops are formed as part of the invention on the outer surfaces of the pockets to regulate and vary the force of the impact of the balls. With the use of the apparatus of the present invention the fines have been cut from approximately one-half to approximately five percent of the output.

In the accompanying drawings forming part of this application, Figure 1 is an elevational view of the discharge end of the drum embodying this invention with parts broken away and with the outer end of the casing removed.

Figure 3 is a perspective view of a sectional drum embodying this invention which may be placed within a drum of conventional design.

Figure 4 is a side elevational view of the sectional drum of Figure 3.

Figure 5 is a sectional view of a hand hole in line 5—5 of Figure 3.

Figure 7 is a longitudinal sectional view of the modification of Figure 6.

Figure 8 is an end elevational view of the drum of Figure 2 from the right.

Figure 9 is an end elevational view of the drum of Figure 2 from the left.

Figure 10 is an end elevational diagrammatic view of the compartments of Figure 6 illustrating the cascading action of the fertilizer material upon the rotation of the compartments.

Figure 11 is a longitudinal sectional view of a modification of the invention of Figure 2.

Figure 13 is a fragmentary end elevational view illustrating the action of knocking balls and the stops and knocking surfaces for the balls.

Figure 14 is an enlarged transverse sectional view of one form of adjustable stop for the balls.

Figure 15 is a similar view of another form of adjustable stop.

Figure 16 is a top plan view of the adjustable stop of Figure 15.

In the drawings similar numerals refer to similar parts throughout the several views.

Figure 6:
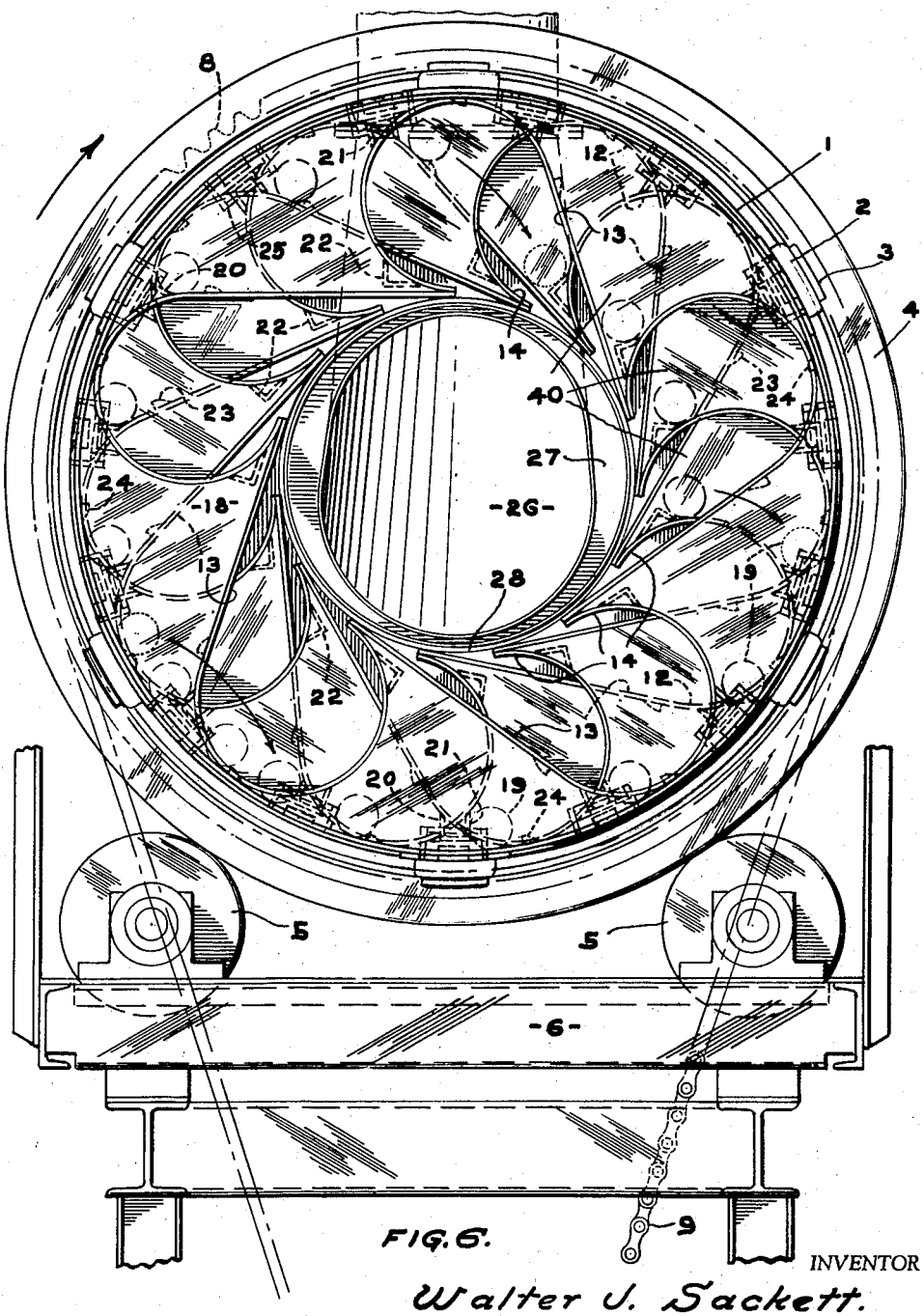
Figure 6 is an end elevational view of a drum embodying three compartments like that of Figure 1, but each is shorter.

The drum 1 has circumferentially spaced therearound adjacent each end bearing blocks 2 on which are held by small strips 3 welded to the blocks, bearing rings 4 to support the large drum on rollers 5. The framework 6 supporting the rollers 5 mounts the drum on a slight angle to the horizontal, with the inlet end of the drum higher so that the material placed in the drum will slowly work toward the other end of the drum. Additional rollers 7 bearing upon the sides of one ring 4 restrain longitudinal movement of the drum. A sprocket ring 8 is placed around the drum which is rotated by chain 9 from a motor 10 through reduction gear 11.

The drum has welded to its inner circumference a plurality of longitudinally extending compartments 12 each transversely shaped very much like an open figure 6 having a substantially plane back 13 and a circular retaining wall or portion 14 and these compartments are placed symmetrically about the interior of the drum with the respective walls of the compartments having the same order so that the retaining wall 14 joins and is welded to the rolling wall 13 of the adjacent compartment.

Figure 2:
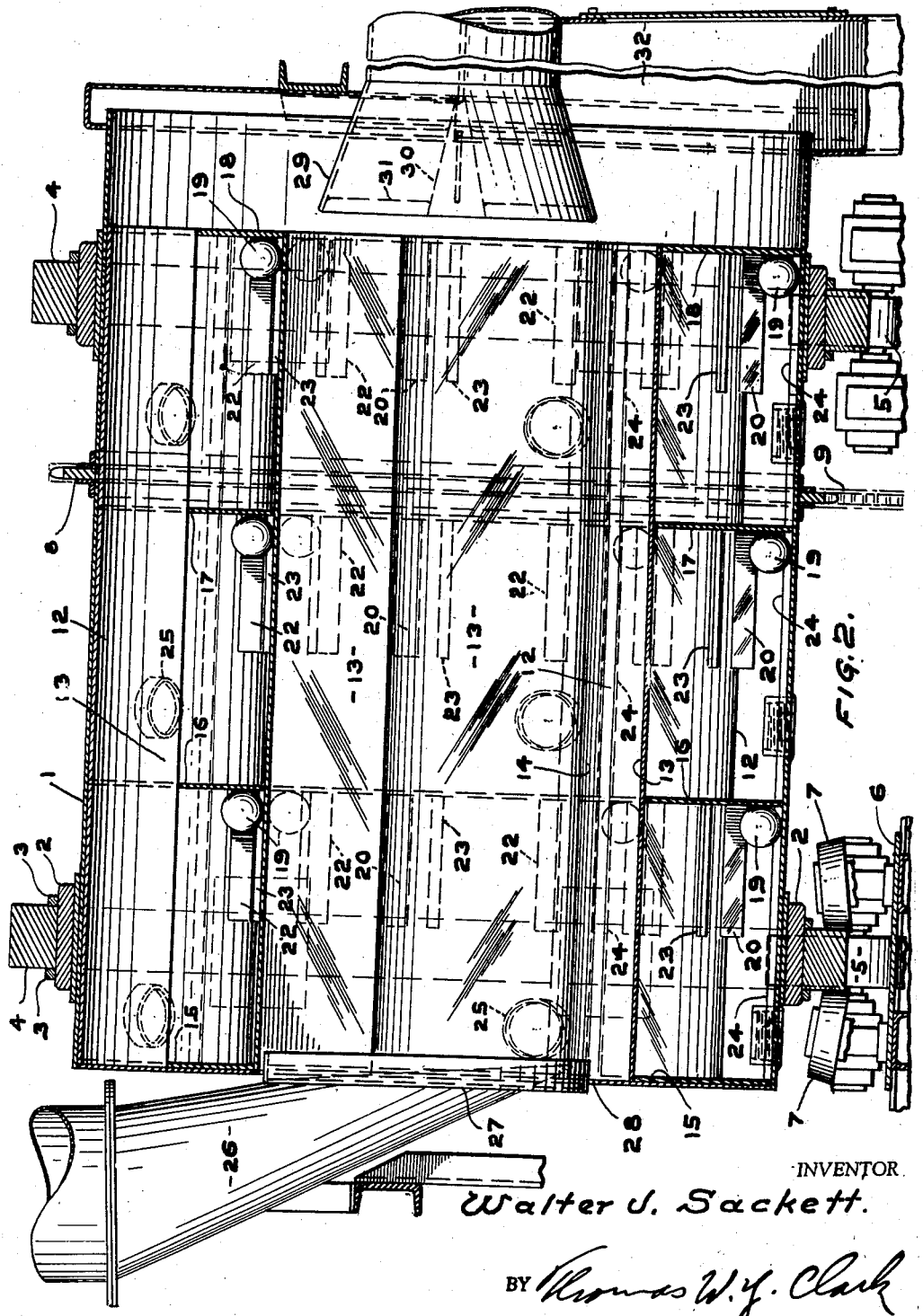
Figure 2 is a transverse sectional view on line 2—2 of Figure 1 of the drum and its accompanying parts.
Figure 1:
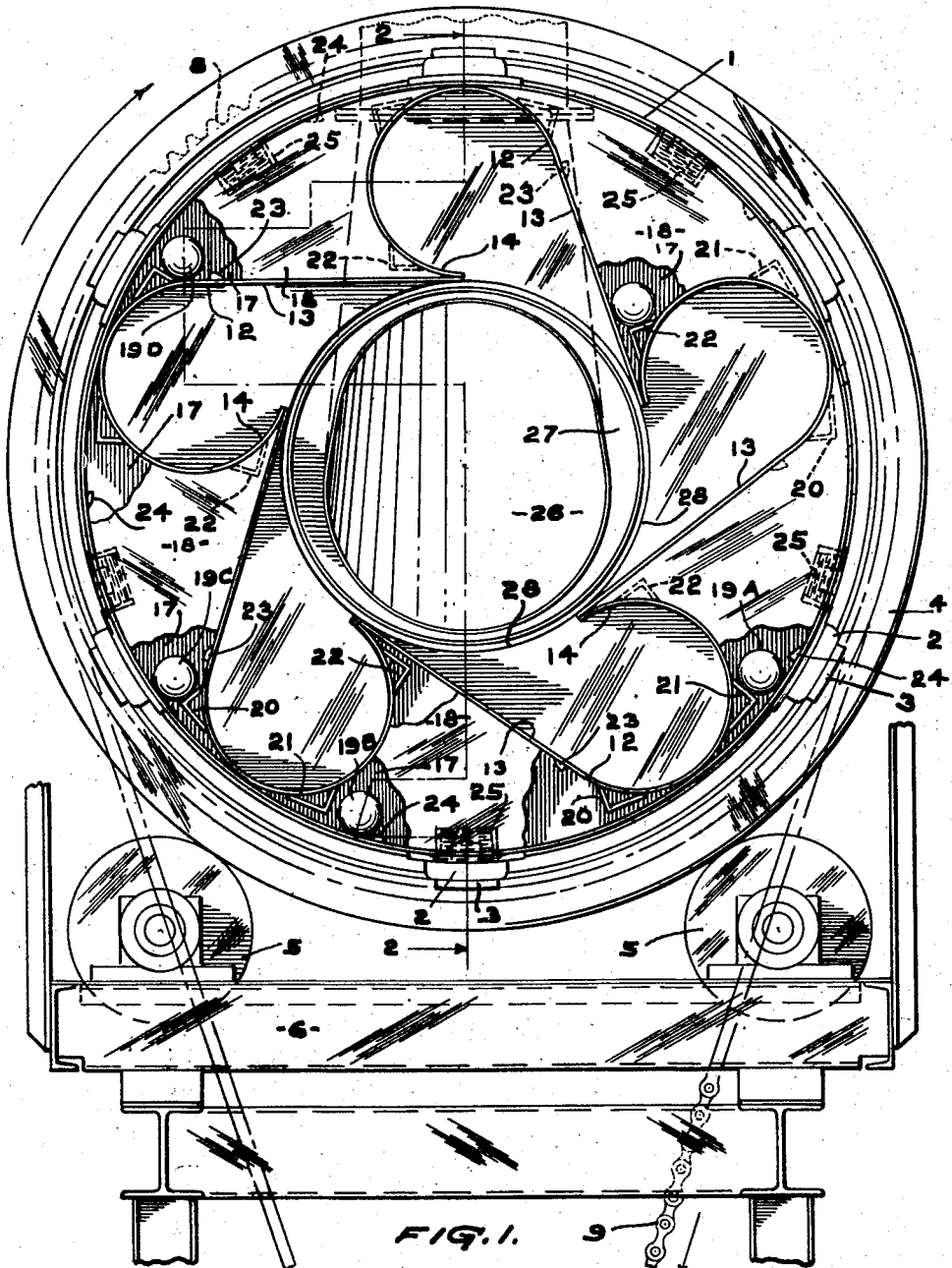
Figure 12:
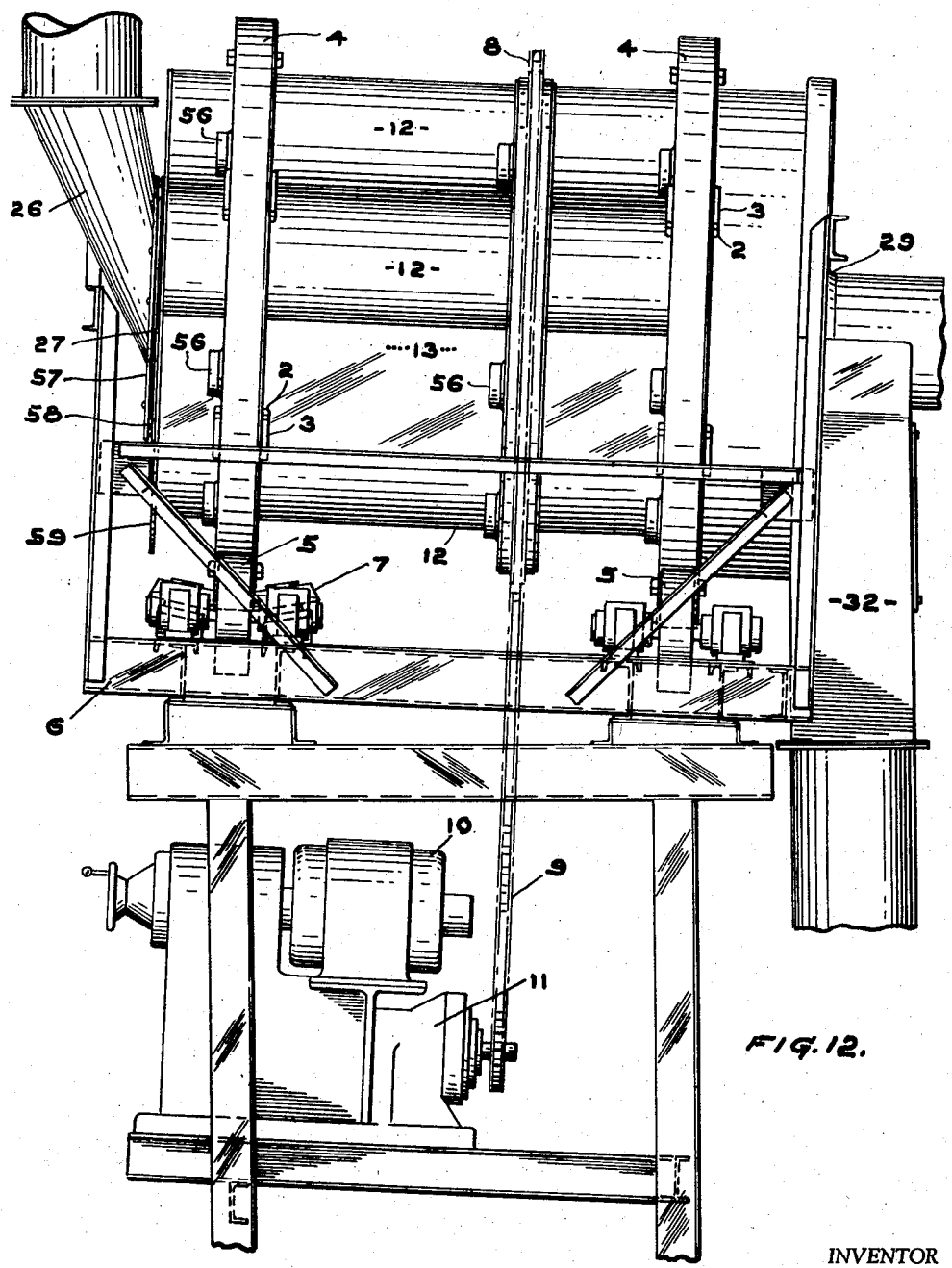
Figure 12 is a side elevational view of the drum construction of Figure 10 showing its mounting and operation.

By this construction, upon the rotation of the drum in the direction of the arrow shown in Figure 1, clockwise, depending upon how full each compartment may be, and depending upon the fluidity of the material, material will begin to be poured from one compartment and rolled down the rolling wall of the next or other compartment to the right upon the rotation of the drum. Each compartment will be emptied before it is ready to receive further material being poured thereinto from the upper compartments. Transverse fragmentary partitions 15, 16, 17 and 18 are positioned around the compartments, one being at each end, to close the space back of the compartments so that there are three transverse spaces as shown in Figure 2 lengthwise of the drum between each adjacent pair of compartments and each such small separate space between the compartments has therein a reasonably heavy knocking ball 19. These balls knock against angles 20, 21, and 22 welded around the circular portion of each compartment in positions to afford normal knocking surfaces against the partitions by the balls as they roll in the separate spaces upon the rotation of the drum. Stops or chocks 23 and 24 are spaced to retain the balls for a portion of the rotation of the drum so that upon the release of the balls from the stops a definite impact is obtained by the balls knocking against the angles on the compartments.

As shown in Figure 1 ball 19A is resting against one angle 21 and back of one stop 24. Upon the continued clockwise motion of the drum, ball 19A assumes the position of 19B and with the continued rotation the ball drops from the stop 24 to the position of ball 19C where it has struck the angle 20 with considerable force to break loose any fertilizer or other material stuck to the lower end of the wall 23. Upon the continued rotation of the drum ball 19C assumes the position of 19D where it is nearly ready to engage the stop 23 and slight further movement clockwise of the drum will release the ball from stop 23 to angle 22 with a hard blow which will release material from the retaining wall lip at 14. As the drum further rotates clockwise the ball will roll over the retaining wall next to the inside of the drum to the position shown at 19A where it will be ready for its next two forceful blows, first upon the plane wall of the compartment and then upon the retaining wall of the compartment, so that every compartment receives a blow on each side with every revolution of the drum. Since there are three separate fragmentary casings lengthwise of the drum between each two compartments, each having a ball therein, each compartment will receive a multiplicity of blows substantially throughout its length with every revolution of the drum. Hand holes 25 are placed in each casing so that the balls may be inserted therein and removed therefrom.

In this construction the moist fertilizer or other material is fed to the drum through chute 26 having a circular end 27 fitting within the circular end 28 of the drum. Surface hardening air is admitted from the discharge end of the drum through flaring blower outlet 29. The air from this outlet is diverted outwardly by the conical member 30 supported in the outlet by web 31. The outlet is supported on the outer chute 32 which receives the granulated material from the ends of the respective pockets or compartments in the drum.

To obtain a more rapid surface hardening of the moist material and to obtain the effect of shorter compartments and greater rolling capacity, the compartments may be divided transversely into several sections and Figures 6 and 7 illustrate three sets of transverse compartments with each set being turned slightly from its adjacent set to give a symmetrical spacing of the compartments and their discharge circularly within the drum. This will then give a symmetrical pouring or cascading of the material through the surface hardening area or zone as illustrated diagrammatically in Figure 9. With this construction the balls each give hard impacts to each longitudinal section of the compartments as each transverse group of balls did in the modification of Figure 1, but with the axial turning of the compartments relative to each other, these hard blows are spaced circumferentially of the drum so that the whole drum is kept in substantial agitation to prevent substantially all adhering of the material to the compartment walls.

The construction of the separate transverse compartments of Figures 6 and 7 is substantially like the single longitudinally extending compartments of Figures 1 and 2 but with the three compartments separate walls are required between the compartments as shown in Figures 6 and 7. The end walls 33 and 34 between the compartments of the transverse group of compartments in transverse section 35 are in themselves complete, so are the end walls 36 and 37 of the transverse compartments 38 complete. Likewise the end walls 39 and 40 of the transverse compartments 41 are complete, this completeness however extends only between the plane rolling wall and the retaining wall so that material may flow longitudinally of the whole drum between the separate transverse compartment sections, being only stopped where it would otherwise flow into the casings provided for the striking balls. It is essential to keep these casings dust proof to assure the proper working of the striking balls.

Were it desired to place compartments of the type illustrated in Figures 6 and 7 in an older drum, they could be made up as separate units as illustrated in Figure 3 with rolling walls 13 and retaining walls 14 and partitions joining opposite walls of adjacent compartments 42—43, all being welded together as a unit in cylindrical wall 44. With this construction hand holes for the insertion of balls must be provided within the compartment walls themselves and they are illustrated at 45. These complete sections may be placed in an old drum either wtih the compartments in longitudinal alignment or turned from that alignment like the compartments illustrated in Figures 6 and 7.

A saving can be made by omitting the drum 1 and having only a cylindrical section 46 at the discharge end of the compartments. In this construction the compartments extend longitudinally as a single unit and are held together by the partitions between the walls of the compartments 47, 48, 49, 50, 51 and 52 formed into circles about the compartments and the spaces between partitions 47—48, 49—50, and 51—52 are closed by rings to form runways or casings 53, 54, and 55 respectively for the balls between the respective compartments. The blocks 2 to support the bearing rings 4 are attached to the outside of these casings for the balls, likewise balls are in the casing 54 serving also as a support for the sprocket 8. In this construction hand holes 56 are in the sides of the casings 53, 54 and 55 for the insertion of the balls.

A ring 57 may be attached to the circular end 27 of chute 26 and there may be a flexible seal 58 attached to the end closing member for the compartments 59 to retain surface hardening air within the compartments or to direct any surplus air up the chute 26.

Instead of having stops as illustrated in Figures 1, 2, 6 and 7, adjustable stops may be provided to retain the balls to give the desired impact. These adjustable stops may comprise a triangular chock 60, back of the thick portion 61 of which the ball is held until the angularity of the ball runway is such as to release it. These chocks are supported in one form on screws 62 to one end of which they are held by collars 63 having cotter pins 64 therethrough which likewise go through the free ends of the screws 62. The threaded ends of the screws 62 go through nuts 65 welded to the outside of the ball runway and the outside of these nuts is also threaded to receive a cap 66 to protect the heads of the screws. Lock nuts 67 lock the screw in adjusted position. Another form of mounting for the chocks is shown in Figures 13, 15 and 16 in which the chocks are supported on rivets 68 welded to the outside of the ball runway and these rivets have therein spaced holes 69 through which the cotter pins 70 pass, also passing through the ends of the chocks as shown at 71. These cotter pins may be placed in their correct holes 69 to give the desired measure of force to the balls through the hand holes in the casings or the drum.

An additional baffle 72 may be welded to the partitions between the compartments to direct the balls behind the adjustable chocks as shown in Figure 13 if desired, although these additional baffles are not ordinarily required.

It will be apparent that the granulator of the present invention will lift and drop the material through the surface hardening area or zone and roll it on the rolling walls of each compartment until substantially all of the particles of fertilizer material obtain a size that will be useful commercially without having to otherwise break up masses or re-circulate fines to any appreciable degree to obtain this commercial product.

Several modifications having been illustrated, it will be apparent that other changes can be made within the scope of the invention.

What is claimed as new and is desired to be secured by Letters Patent is:

1. In a granulator for moist fertilizer and similar materials, a tubular member sloped from the horizontal to progress material therethrough upon axial rotation of the member, the member including a plurality of longitudinally extending compartments of rigid construction circularly and contiguously spaced about the member axis of rotation and leaving axially therebetween a substantially circular open surface hardening zone, each compartment having a substantially plane rolling wall and an opposed retaining wall, one rolling wall edge extending substantially to the outer periphery of the tubular member and back of the retaining wall of the respective compartment to form a material retaining pocket between the walls of each compartment, the said respective walls of the several compartments being spaced in the same order about the surface hardening zone, the rolling wall of each compartment having an opposite edge spaced inwardly axially from its substantially peripheral edge, the rolling wall at this opposite edge being substantially tangential to the surface hardening zone and joining the retaining wall of the adjacent compartment, whereby, upon rotation of the member toward the direction of the end of the rolling walls tangential to the surface hardening zone, material is cascaded from the upper retaining walls to the lower rolling walls to adhere the material together upon rolling into particles of substantial size.

2. The granulator of claim 1 including a closure for the high end of the member having an axial opening therein for the admission of material to the member and a forced draft air inlet axially of the low end of the member substantially coextensive with, and to force air through, the surface hardening area and the cascading material.

3. The granulator of claim 1 including weights adjacent the sides of the compartments movable upon the rotation of the member to strike the sides of the compartments to release material from the compartments.

4. The granulator of claim 1 including weights adjacent the sides of the compartments movable upon the rotation of the member to strike the sides of the compartments to release material from the compartments, the weights striking the compartments when in their upper discharging position.

5. The granulator of claim 1 including weights adjacent the sides of the compartments movable upon the rotation of the member to strike the sides of the compartments to release material from the compartments, further rotation of the member returning the weights to a suspended position for repeated blows.

6. The granulator of claim 1 including weights adjacent the sides of the compartments movable upon the rotation of the member to strike the sides of the compartments to release material from the compartments and means to vary the force of the impact of the weights upon the compartments.

7. The granulator of claim 1 including closed cylindrical casings between adjacent compartments, rolling impact members in said casings, said impact members striking the wall of the compartments to release material therefrom upon rotation of the first named member.

8. The granulator of claim 1 including closed cylindrical casings between adjacent compartments, rolling impact members in said casings, said impact members striking the wall of the compartments to release material therefrom upon rotation of the first named member, and means to vary the force of the impact of the impact members upon the compartments.

9. A granulator comprising a plurality of members as defined in claim 1 connected axially in line and each displaced rotatably from the other and having transverse fragmentary partitions circumferentially between the walls of each compartment at the ends adjacent each juncture of members to retain the material within the compartments while allowing its passage between the compartments of adjacent members.

10. The granulator of claim 1 including weights to strike both walls of each compartment upon rotation of the member.

11. The granulator of claim 1 including a weight between the walls of adjacent compartments and means to position the weight to successively strike the walls of both adjacent compartments upon the rotation of the member.

12. The granulator of claim 1 including cylindrical casings between adjacent compartments, rolling impact members in said casings, said impact members striking the wall of the compartments to release material therefrom upon rotation of the first named member, and means to vary the force of the impact of the impact members.

References Cited in the file of this patent

UNITED STATES PATENTS

| Re. 23,825 | Clark et al. | May 11, 1954 |
| 2,695,221 | Klugh et al. | Nov. 23, 1954 |